(12) United States Patent
Kida

(10) Patent No.: US 8,941,647 B2
(45) Date of Patent: Jan. 27, 2015

(54) DEPTH ESTIMATION DATA GENERATING APPARATUS, DEPTH ESTIMATION DATA GENERATING METHOD, AND DEPTH ESTIMATION DATA GENERATING PROGRAM, AND PSEUDO THREE-DIMENSIONAL IMAGE GENERATING APPARATUS, PSEUDO THREE-DIMENSIONAL IMAGE GENERATING METHOD, AND PSEUDO THREE-DIMENSIONAL IMAGE GENERATING PROGRAM

(75) Inventor: Shingo Kida, Tokyo (JP)

(73) Assignee: JVC Kenwood Corporation (JP)

( * ) Notice: Subject to any disclaimer, the term of this patent is extended or adjusted under 35 U.S.C. 154(b) by 57 days.

(21) Appl. No.: 13/615,822

(22) Filed: Sep. 14, 2012

(65) Prior Publication Data

US 2013/0076744 A1 Mar. 28, 2013

(30) Foreign Application Priority Data

Sep. 22, 2011 (JP) ................................ 2011-206788

(51) Int. Cl.
*G06T 15/00* (2011.01)
*G06T 7/00* (2006.01)
*G06T 17/00* (2006.01)

(52) U.S. Cl.
CPC .................................... *G06T 7/0051* (2013.01)
USPC ......................................... 345/419; 345/420

(58) Field of Classification Search
USPC .................................................. 345/420, 419
See application file for complete search history.

(56) References Cited

U.S. PATENT DOCUMENTS

| 7,262,767 | B2 * | 8/2007 | Yamada ........................ 345/419 |
| 2009/0022396 | A1 * | 1/2009 | Watanabe et al. ............. 382/167 |
| 2009/0041339 | A1 * | 2/2009 | Yamada et al. ................ 382/154 |
| 2011/0080400 | A1 * | 4/2011 | Yamada ........................ 345/419 |
| 2011/0090216 | A1 * | 4/2011 | Yamada et al. ................ 345/419 |
| 2011/0273531 | A1 * | 11/2011 | Ito et al. .......................... 348/43 |

FOREIGN PATENT DOCUMENTS

| JP | 2005151534 | 6/2005 |
| JP | 2006185033 | 7/2006 |

* cited by examiner

*Primary Examiner* — Javid A Amini
*Assistant Examiner* — Jin Ge
(74) *Attorney, Agent, or Firm* — Cantor Colburn LLP

(57) ABSTRACT

A high frequency component detector detects a high frequency component of an R signal. A high frequency component comparator outputs a flag indicating a threshold value division range having the highest threshold value including a value of a high frequency component in a specific period. A gain calculating unit calculates a ratio as a gain, the ratio set according to the threshold value division range indicated by the flag input. A multiplying unit multiplies the R signal and the gain to generate an object signal R' wherein a concavity and convexity difference with adjacent pixels in a small region of an image is suppressed compared to the R signal.

7 Claims, 11 Drawing Sheets

FIG. 8A
PIXEL ● CURRENT   DETECTED PHASE OF
                 HIGH FREQUENCY COMPONENT
                 ○ DETECTED PHASE
FIG. 8B
FIG. 8C
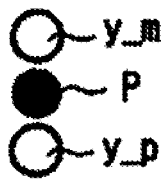

COMPARING PERIOD OF HIGH
FREQUENCY COMPONENT

PIXEL

FRONT 3 PIXELS AND
REAR 3 PIXELS INCLUDING
CURRENT PIXEL

DEPTH ESTIMATION DATA GENERATING APPARATUS, DEPTH ESTIMATION DATA GENERATING METHOD, AND DEPTH ESTIMATION DATA GENERATING PROGRAM, AND PSEUDO THREE-DIMENSIONAL IMAGE GENERATING APPARATUS, PSEUDO THREE-DIMENSIONAL IMAGE GENERATING METHOD, AND PSEUDO THREE-DIMENSIONAL IMAGE GENERATING PROGRAM

CROSS-REFERENCE TO RELATED PATENT APPLICATIONS

This application claims the benefit of Japanese Patent Application No. 2011-206788, filed on Sep. 22, 2011, in the Japan Patent Office, the disclosure of which is incorporated herein in its entirety by reference.

BACKGROUND OF THE INVENTION

1. Field of the Invention

The present invention relates to a depth estimation data generating apparatus, depth estimation data generating method, and depth estimation data generating program, and a pseudo three-dimensional (3D) image generating apparatus, pseudo 3D image generating method, and pseudo 3D image generating program, and more particularly, to a depth estimation data generating apparatus, depth estimation data generating method, and depth estimation data generating program, which generate depth estimation data from an image (non-3D image) to which depth information is neither explicitly included nor implicitly included like a stereo image, and an pseudo 3D image generating apparatus, pseudo 3D image generating method, and pseudo 3D image generating program, which perform a process on the non-3D image based on the depth estimation data to generate and output a non-3D image having a different viewpoint for a 3D effect.

2. Description of the Related Art

In order to view a non-three-dimensional (3D) image in pseudo stereovision, a 3D display system generates a pseudo 3D image from general still images or a plurality of continuous images in time series forming a moving image, i.e., from an image (non-3D image) to which depth information for a 3D effect is neither included explicitly nor included implicitly like a stereo image.

An example of such a technology includes a pseudo 3D image generating device disclosed in Patent Document 1. In order to determine a scene structure close to reality as much as possible, the pseudo 3D image generating device of Patent Document 1 determines a composition ratio according to high frequency component estimation values of a non-3D image input from an upper screen high frequency component estimation unit and a lower screen high frequency component estimation unit, by using images of a plurality of types of basic depth models indicating depth values respectively for a plurality basic types of scene structures, and the images of the plurality of types of basic depth models are composed according to the composition ratio. Then, the composed images of the basic depth models and a red (R) signal of the non-3D image are superimposed to generate final depth estimation data. Also, by processing an image signal of the non-3D image based on the depth estimation data, an image signal of different viewpoint image for a 3D effect is generated.

The pseudo 3D image generating device of Patent Document 1 generates the final depth estimation data by composing the images of the plurality of types of basic depth models according to the composition ratio determined according to the high frequency component evaluation values of the input non-3D image, and superimposing the R signal of the non-3D image on the composed images of the basic depth models, as object information.

However, in the pseudo 3D image generating device of Patent Document 1, since the depth estimation data is generated via the superimposition on the composed images of the basic depth models depending on a level of the R signal for any pattern, for example, only a detailed portion (small area) in a same object may seem to excessively protrude, and as a result, separation in the same object or a location relationship of objects may be discrepant.

[Patent Document 1] Japanese Laid-Open Patent Publication No. 2005-151534

SUMMARY OF THE INVENTION

The present invention provides a depth estimation data generating apparatus, depth estimation data generating method, and depth estimation data generating program, and a pseudo three-dimensional (3D) image generating apparatus, pseudo 3D image generating method, and pseudo 3D image generating program, which generate a pseudo 3D image that brings a natural 3D effect by preventing separation in a same object or discrepancy of a location relationship of objects.

According to an aspect of the present invention, there is provided a depth estimation data generating apparatus including: a generating unit which generates images of a plurality of basic depth models respectively indicating depth values of a plurality of basic scene structures; a composition ratio calculating unit which calculates a composition ratio between the images of the plurality of basic depth models by using statistics of at least some pixel values in a predetermined region in a screen of a non-3D image, so as to estimate a scene structure of the non-3D image whose depth information is neither included explicitly nor included implicitly like a stereo image; a composing unit which composes the images of the plurality of basic depth models generated by the generating unit according to the composition ratio and generates a basic depth model-composed image; a high frequency component detecting unit to which an object signal indicating object information about concavity and convexity of a pseudo 3D image is supplied from the non-3D image, and which detects a high frequency component indicating an edge of the object signal; a gain generating unit which generates a gain having a smaller value as a value of the high frequency component detected by the high frequency component detecting unit is higher; a compensated object signal generating unit which multiplies the object signal and the gain generated by the gain generating unit and generates a compensated object signal wherein a level of the object signal is compensated for and an adding unit which adds the compensated object signal to the basic depth model-composed image composed by the composing unit and generates depth estimation data for generating an image having a viewpoint different from the non-3D image, the image constituting a pseudo 3D image with the non-3D image.

The gain generating unit may include: a high frequency component comparing unit which compares and determines which threshold value division range from among a plurality of threshold value division ranges defined by threshold values includes the value of the high frequency component supplied from the high frequency component detecting unit for each specific period in which the object signal is pre-set, and outputs a flag indicating a threshold value division range having the highest threshold value including the value of the high frequency component in the each specific period; and a gain calculating unit which calculates a ratio corresponding to the threshold value division range indicated by the flag supplied from the high frequency component comparing unit as the gain, wherein ratios corresponding to the plurality of threshold value division ranges are pre-set, each ratio having a smaller value as a threshold value corresponding to each ratio is higher.

According to another aspect of the present invention, there is provided a depth estimation data generating method including: calculating a composition ratio between images of a plurality of basic depth models respectively indicating depth values of a plurality of basic scene structures, by using statistics of at least some pixel values in a predetermined region in a screen of a non-3D image, so as to estimate a scene structure of the non-3D image to which depth information is neither included explicitly nor included implicitly like a stereo image; generating a basic depth model-composed image by composing the images of the plurality of basic depth models according to the composition ratio; detecting a high frequency component indicating an edge of an object signal indicating object information about concavity and convexity of a pseudo 3D image, the object signal being supplied from the non-3D image; generating a gain having a smaller value as a value of the high frequency component detected via the detecting of the high frequency component is higher; generating a compensated object signal wherein a level of the object signal is compensated for, by multiplying the object signal and the gain generated via the generating of the gain; and adding the compensated object signal to the basic depth model-composed image composed via the generating of the basic depth model-composed image to generate depth estimation data for generating an image having a different viewpoint from the non-3D image, the image constituting a pseudo 3D image with the non-3D image.

According to another aspect of the present invention, there is provided a depth estimation data generating program realized by a computer: calculating a composition ratio between images of a plurality of basic depth models respectively indicating depth values of a plurality of basic scene structures, by using statistics of at least some pixel values in a predetermined region in a screen of a non-3D image, so as to estimate a scene structure of the non-3D image to which depth information is neither included explicitly nor included implicitly like a stereo image; generating a basic depth model-composed image by composing the images of the plurality of basic depth models according to the composition ratio; detecting a high frequency component indicating an edge of an object signal indicating object information about concavity and convexity of a pseudo 3D image, the object signal being supplied from the non-3D image; generating a gain having a smaller value as a value of the high frequency component detected via the detecting of the high frequency component is higher; generating a compensated object signal wherein a level of the object signal is compensated for, by multiplying the object signal and the gain generated via the generating of the gain; and adding the compensated object signal to the basic depth model-composed image composed via the generating of the basic depth model-composed image to generate depth estimation data for generating an image having a different viewpoint from the non-3D image, the image constituting a pseudo 3D image with the non-3D image.

According to another aspect of the present invention, there is provided a pseudo 3D image generating apparatus including: a different viewpoint image generating unit which generates a different viewpoint image by shifting a texture of a non-3D image by an amount according to depth estimation data of a portion corresponding to the texture of the non-3D image, based on the depth estimation data generated by the apparatus of claim 1 to which the non-3D image is supplied and the non-3D image to which depth information is neither included explicitly nor included implicitly like a stereo image; and an output unit which outputs a pseudo 3D image wherein one of the non-3D image and the different viewpoint image is a left-eye image and the other is a right-eye image.

According to another aspect of the present invention, there is provided a pseudo 3D image generating method including: generating a different viewpoint image by shifting a texture of a non-3D image by an amount according to depth estimation data of a portion corresponding to the texture of the non-3D image, based on the depth estimation data generated by the apparatus of claim 3 to which the non-3D image is supplied and the non-3D image to which depth information is neither included explicitly nor included implicitly like a stereo image; and outputting a pseudo 3D image wherein one of the non-3D image and the different viewpoint image is a left-eye image and the other is a right-eye image.

According to another aspect of the present invention, there is provided a pseudo 3D image generating program which realizes in a computer: generating a different viewpoint image by shifting a texture of a non-3D image by an amount according to depth estimation data of a portion corresponding to the texture of the non-3D image, based on the depth estimation data generated by the apparatus of claim 4 to which the non-3D image is supplied and the non-3D image to which depth information is neither included explicitly nor included implicitly like a stereo image; and outputting a pseudo 3D image wherein one of the non-3D image and the different viewpoint image is a left-eye image and the other is a right-eye image.

BRIEF DESCRIPTION OF THE DRAWINGS

The above and other features and advantages of the present invention will become more apparent by describing in detail exemplary embodiments thereof with reference to the attached drawings in which:

FIGS. 8A to 8C are diagrams for explaining an example of an operation of a high frequency component detector of FIG. 7;

DETAILED DESCRIPTION OF THE INVENTION

Hereinafter, the present invention will be described in detail by explaining exemplary embodiments of the invention with reference to the attached drawings.

Figure 1:
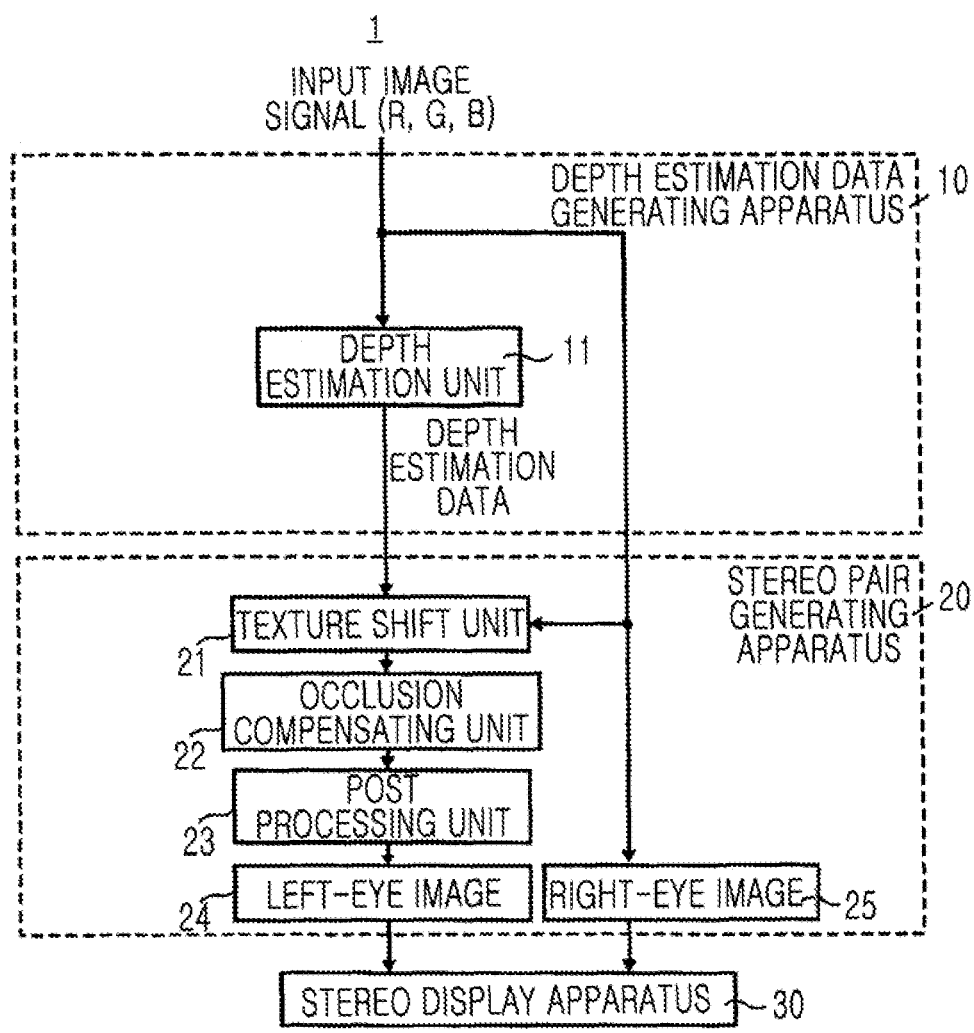
FIG. 1 is a block diagram showing a pseudo three-dimensional (3D) image generating apparatus according to an embodiment of the present invention.

FIG. 1 is a block diagram showing a pseudo three-dimensional (3D) image generating apparatus 1 according to an embodiment of the present invention. The pseudo 3D image generating apparatus 1 of the present embodiment is an apparatus performing a so-called 2D-3D conversion, which generates a pseudo 3D color image from a 2D color image (non-3D image) to which depth information is neither explicitly included nor implicitly included like a stereo image. The pseudo 3D image generating apparatus 1 generates an image having a viewpoint different from a viewpoint of the non-3D image based on an input image signal of the non-3D image.

The pseudo 3D image generating apparatus 1 includes a depth estimation data generating apparatus 10 which generates depth estimation data with respect to the input image signal of the non-3D image, and a stereo pair generating apparatus 20 which generates an image having a viewpoint different from an input non-3D image based on the depth estimation data, wherein the image having the different viewpoint constitutes a pseudo 3D image with the input non-3D image, and outputs the image having the different viewpoint with the input non-3D image as a stereo pair. A stereo display apparatus 30 receives the stereo pair output from the stereo pair generating apparatus 20 as an input signal and displays a pseudo 3D image.

A depth estimation unit 11 is an embodiment of a depth estimation data generating apparatus of the present invention. The depth estimation unit 11 will be described in detail below. The stereo pair generating apparatus 20 includes a texture shift unit 21 which shifts a texture of the input non-3D image according to depth estimation data generated by the depth estimation unit 11, an occlusion compensating unit 22 which compensates for occlusion, and a post processing unit 23 which performs a post process. The stereo pair generating apparatus 20 outputs a left-eye image 24 that has been shifted from the post processing unit 23 while outputting a right-eye image 25 which is the input image signal. In other words, when the input non-3D image is the right-eye image 25, the stereo pair generating apparatus 20 generates the left-eye image 24 constituting a pseudo 3D image, with the right-eye image 25, and outputs the left-eye image 24 with the right-eye image 25 as a stereo pair. The stereo pair generating apparatus 20 constitutes a different viewpoint image generating unit (not shown) which generates an image having a different viewpoint generated by shifting the texture of the non-3D image by an amount according to the depth estimation data of a corresponding portion based on the depth estimation data and the non-3D image.

A structure and operation of the depth estimation unit 11 constituting an embodiment of a depth estimation data generating apparatus of the present invention will now be described in detail.

Figure 2:
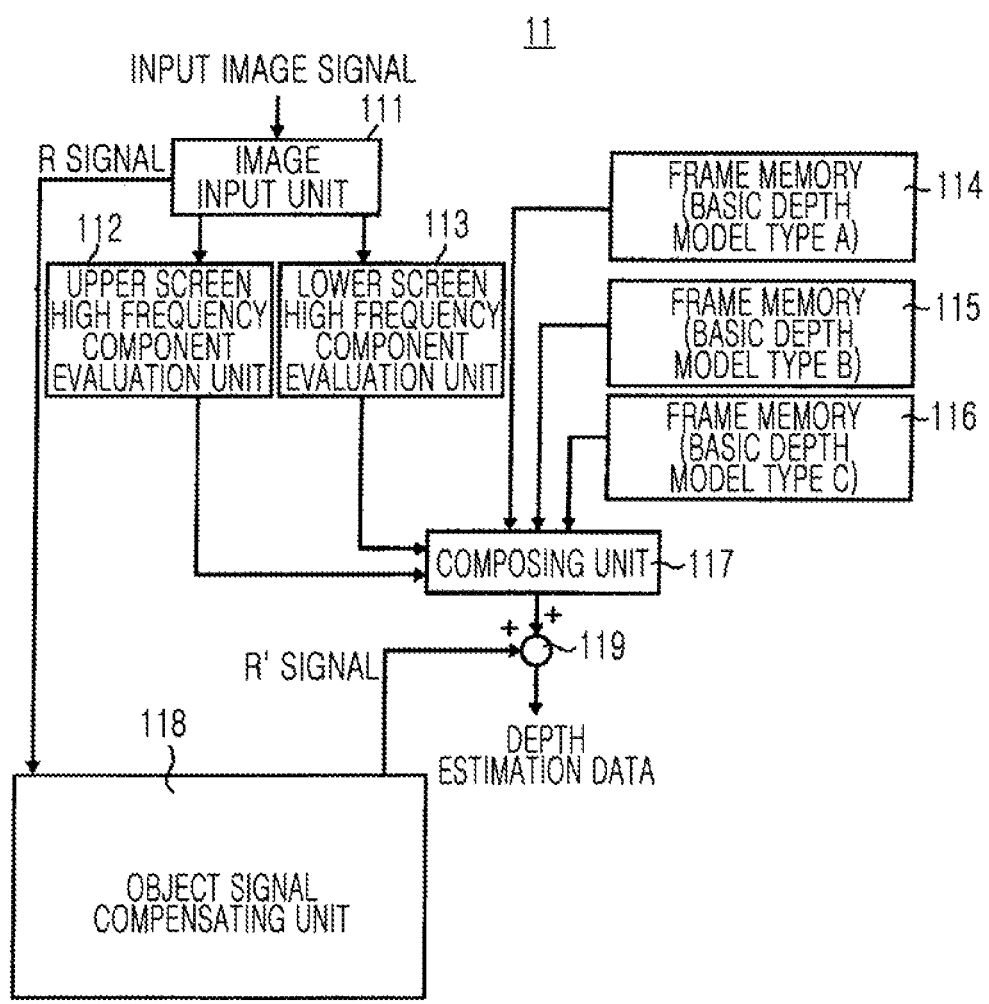
FIG. 2 is a block diagram of a depth estimation unit constituting a depth estimation data generating apparatus, according to an embodiment of the present invention.

FIG. 2 is a block diagram of the depth estimation unit 11 according to an embodiment of the present invention. As shown in FIG. 2, the depth estimation unit 11 includes an image input unit 111, an upper screen high frequency component evaluation unit 112, a lower screen high frequency component evaluation unit 113, frame memories 114 through 116, a composing unit 117, an object signal compensating unit 118, and an adding unit 119. The depth estimation unit 11 is characterized in including the object signal compensating unit 118.

In FIG. 2, the image input unit 111 includes a frame memory and temporarily stores an input image signal per one frame, the input image signal per one frame being a non-3D image signal, and then supplies a luminance signal in the input image signal per one frame to the upper screen high frequency component evaluation unit 112 and the lower screen high frequency component evaluation unit 113, while supplying a red (R) signal in the input image signal to the object signal compensating unit 118.

The upper screen high frequency component evaluation unit 112 and the lower screen high frequency component evaluation unit 113 constitute a composition ratio calculating unit which calculates a corn position ratio between images of three types of basic depth models described below, by using statistics of at least some pixel values in a predetermined region in a screen of the non-3D image, so as to estimate a scene structure of the non-3D image.

In other words, the upper screen high frequency component evaluation unit 112 obtains a high frequency component in a region corresponding to about 20% of an upper screen with respect to the input image signal per one frame to calculate an upper screen high frequency component evaluation value top_act. Then, the upper screen high frequency component evaluation unit 112 supplies the upper screen high frequency component evaluation value top_act to the composing unit 117. The lower screen high frequency component evaluation unit 113 obtains a high frequency component in a region corresponding to about 20% of a lower screen with respect to the input image signal per one frame to calculate a lower screen high frequency component evaluation value bottom_act. Then, the lower screen high frequency component evaluation unit 113 supplies the lower screen high frequency component evaluation value bottom_act to the composing unit 117. The upper screen high frequency component evaluation value top_act and the lower screen high frequency component evaluation value bottom_act indicate statistics of pixel values respectively in predetermined regions (each 20%) of the upper screen and the lower screen of the non-3D image. Also, the high frequency component is a frequency signal component indicating an edge of the non-3D image.

Meanwhile, the frame memory 114 stores an image of a basic depth model type A in advance, the frame memory 115 pre-stores an image of a basic depth model type B in advance, and the frame memory 116 pre-stores an image of a basic depth model type C in advance. The frame memories 114 through 116 constitute a generating unit of the depth estimation data generating apparatus 10 of the present invention. Each of the images of the basic depth model types A through C is an image indicating a depth value of a scene structure for generating a pseudo 3D image signal.

Figure 3:
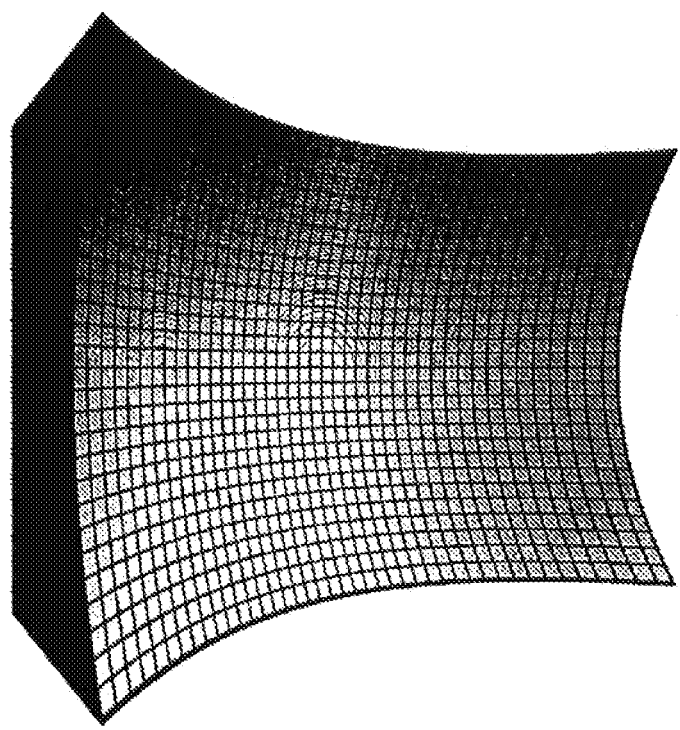
FIG. 3 is a view showing a 3D structure of a basic depth model type A, according to an embodiment of the present invention.

For example, the image of the basic depth model type A is an image of a depth model with a concave surface having a spherical shape, i.e., an image having a 3D structure shown in FIG. 3. The image of the basic depth model type A is used in many cases. In a scene where an object does not exist, a center of a screen may be set to have a longest distance, so as to obtain a 3D effect having low disharmony and comfortable depth.

Figure 4:
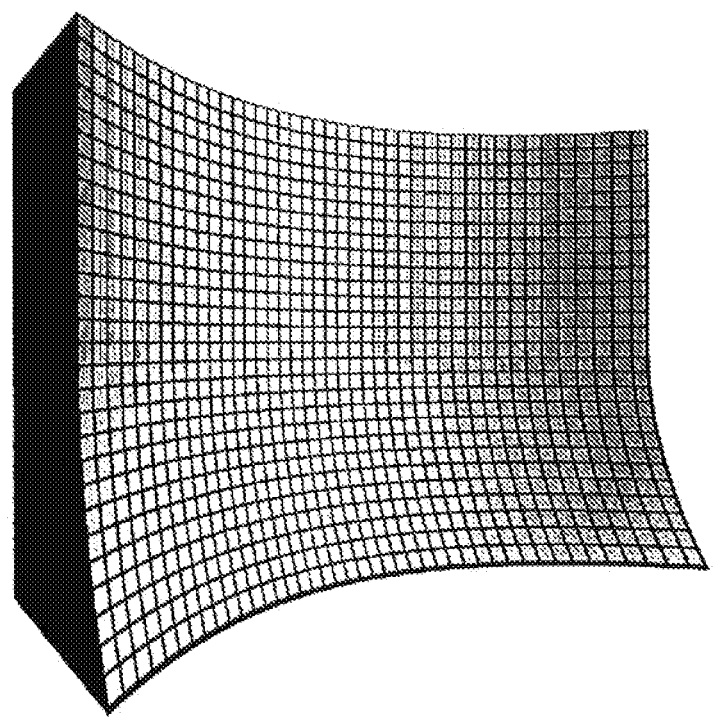
FIG. 4 is a view showing a 3D structure of a basic depth model type B, according to an embodiment of the present invention.

Also, the image of the basic depth model type B is obtained by replacing a top portion of the image of the basic depth model type A with an arch-shaped cylindrical surface, instead of a spherical surface. As a 3D structure shown in FIG. 4, the top portion is a cylindrical surface (an axis is in a vertical direction) and a bottom portion is a concave surface (spherical surface).

Figure 5:
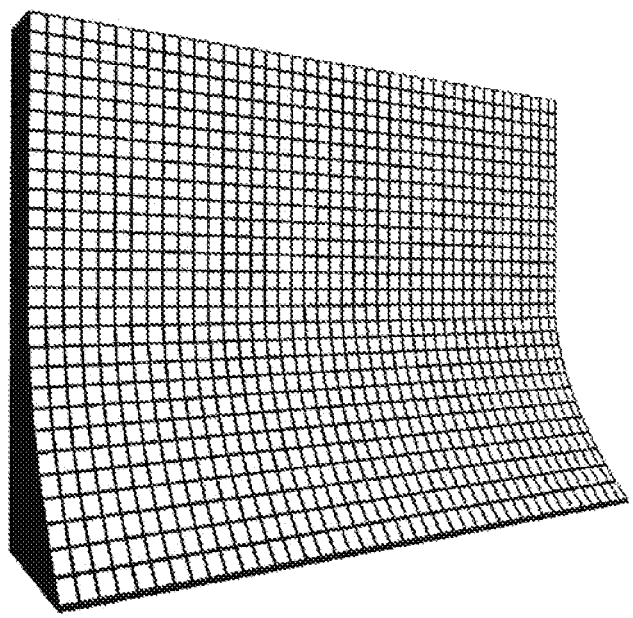
FIG. 5 is a view showing a 3D structure of a basic depth model type C, according to an embodiment of the present invention.

Also, the image of the basic depth model type C is an image of a model having a 3D structure shown in FIG. 5, wherein a top portion is a planar surface and a bottom portion is cylindrical surface continuously extending down from the planar surface and curving further forwardly, that is, the top portion is the planar surface and the bottom portion is the cylindrical surface (an axis is in a horizontal direction). The images of the basic depth model types A through C respectively stored in the frame memories 114 through 116 constituting a basic depth model type generating unit (not shown) are supplied to the composing unit 117.

The composing unit 117 first automatically calculates a composition ratio k1 of the basic depth model type A, a composition ratio k2 of the basic depth model type B, and a composition ratio k3 of the basic depth model type C, by using a predetermined method based on the upper screen high frequency component evaluation value top_act supplied from the upper screen high frequency component evaluation unit 112 and the lower screen high frequency component evaluation value bottom_act supplied from the lower screen high frequency component evaluation unit 113, not considering a scene of an image. Also, a sum of the three composition ratios k1 through k3 is always 1.

Figure 6:
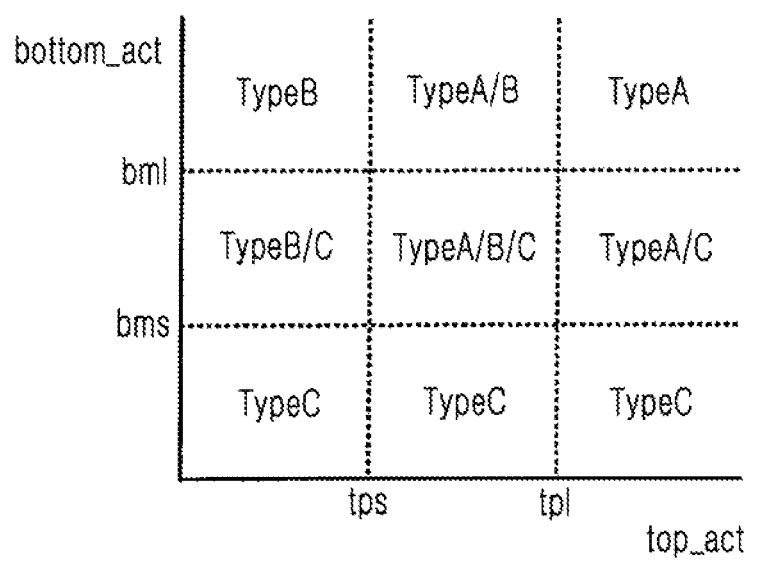
FIG. 6 is a diagram for explaining an example of a condition for determining a composition ratio of a basic depth model.

FIG. 6 is a diagram for explaining an example of a condition for determining a composition ratio. Referring to FIG. 6, a composition ratio is determined according to ratios of each of the upper screen high frequency component evaluation value (hereinafter, abbreviated to a top high frequency component evaluation value) top_act in a horizontal axis and the lower screen high frequency component evaluation value (hereinafter, abbreviated to a bottom high frequency component evaluation value) bottom_act in a vertical axis, and predetermined values tps, tpl, bms, and bml.

In FIG. 6, regions where a plurality of types are written are linearly composed according to high frequency component evaluation values. For example, in a region "Type A/B" of FIG. 6, a ratio of Type A which is a value of the basic depth model type A and Type B which is a value of the basic depth model type B is determined based on a ratio of the top high frequency component evaluation value top_act and the bottom high frequency component evaluation value bottom_act as below, and Type C which is a value of the basic depth model type C is not used to determine the ratio.

Type $A$:Type $B$:Type $C$ =(top_act−$tps$):($tpl$−top_act):0

Also, in a region "Type A/B/C" of FIG. 6, a value of Type A/B/C is determined as below by employing an average of Type A/B and Type A/C.

Type $A$:Type $B$:Type $C$ =(top_act−$tps$)+(bottom_act−$bms$):($tpl$−top_act):($bml$−bottom_act)

Also, each of the composition ratios k1, k2, and k3 is calculated as follows:

$k1$=Type $A$/(Type $A$+Type $B$+Type $C$)     (1)

$k2$=Type $B$/(Type $A$+Type $B$+Type $C$)     (2)

$k3$=Type $C$/(Type $A$+Type $B$+Type $C$)     (3)

Continuously, the composing unit 117 calculates each of a first multiplication result of the composition ratio k1 and Type A, i.e., the value of the basic depth model type A, a second multiplication result of the composition ratio k2 and Type B, i.e., the value of the basic depth model type B, and a third multiplication result of the composition ratio k3 and Type C, i.e., the value of the basic depth model type C, from among the composition ratios k1 through k3 calculated as above, and additionally adds the first through third multiplication results to generate an image signal constituting a composed depth model.

Also, the images of the basic depth model types A through C and the condition for determining the composition ratio are identical to the well-known images of basic depth model types A through C and the determination condition disclosed in Patent Document 1 by the present applicant, but are not limited thereto. Also, the structure of the composing unit 117 may be identical to the structure disclosed by the present applicant in Japanese Laid-Open Patent Publication No. 2006-185033.

As such, the three types of basic depth models are prepared as depth structure models of a basic scene, the image of the basic depth model type A is used as a basis in the composing unit 117, and when the top high frequency component evaluation value top_act is small, the basic scene is recognized to include a space or a flat wall in the upper screen, and thus a composition ratio of the image of the basic depth model type B, wherein the depth of the upper screen is deep, is increased, whereas when the bottom high frequency component evaluation value bottom_act is small, the basic scene is recognized to have a flat ground or water surface continuously spreading forward at the lower screen, and thus a composition ratio of the image of the basic depth model type C, wherein the upper screen approximately has a planar surface in a distant view and the depth of the lower screen decreases downward, is increased. Accordingly, a scene structure close to reality as much as possible may be determined without disharmony in any image.

Next, the object signal compensating unit 118 compensates for the R signal (corresponds to an object signal indicating object information about concavity and convexity of a to-be-generated pseudo 3D image) in the input image signal supplied from the image input unit 111, and supplies a compensated object signal (R signal) to the adding unit 119. One of the reasons the R signal is used as an object signal is because a size of the R signal is near to a front light and is highly likely to match concavity and convexity of an object under a condition that luminosity of texture does not largely vary. Another reason is that it is possible to emphasize a 3D effect by disposing depths of red and warm colors in front, since red and warm colors are advancing colors in chromatics and are recognized to have advancing depths compared to cold colors.

Figure 7:
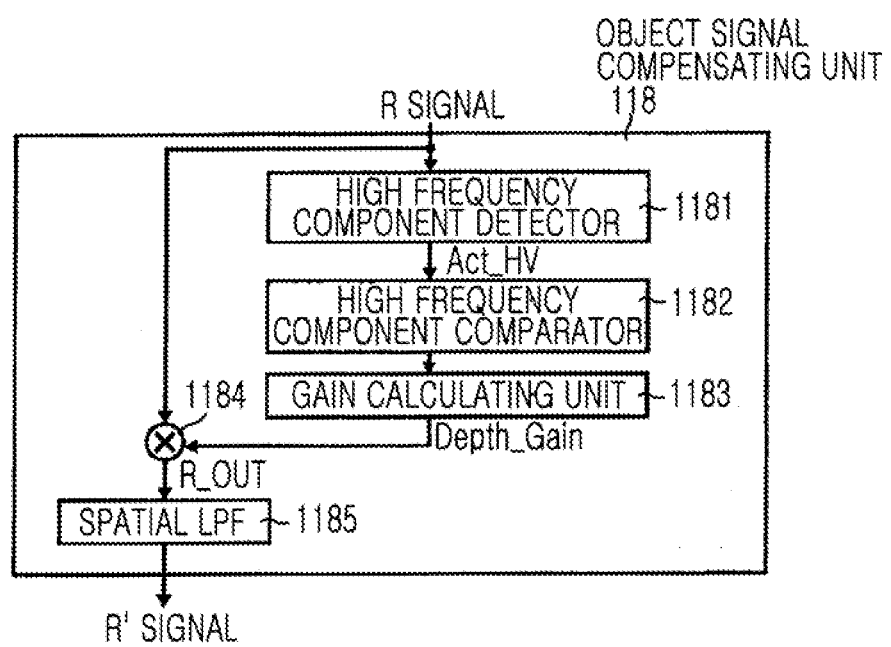
FIG. 7 is a block diagram of an object signal compensating unit of FIG. 2, according to an embodiment.

FIG. 7 is a block diagram of the object signal compensating unit 118 according to an embodiment. As shown in FIG. 7, the object signal compensating unit 118 includes a high frequency component detector 1181 which detects a high frequency component of the R signal that is the object signal supplied from the image input unit 111, a high frequency component comparator 1182 which compares the high frequency component and a plurality of divided threshold ranges, a gain calculating unit 1183 which calculates a gain according to a comparison result of the high frequency component comparator 1182, a multiplying unit 1184 which multiplies the gain and the object signal (R signal), and a spatial low pass filter (LPF) 1185 which generates the R' signal by reducing a high frequency component of a multiplication signal output from the multiplying unit 1184.

The high frequency component detector 1181 receives the R signal as the object signal, in the input image signal of the non-3D image from the image input unit 111, and detects the high frequency component of the R signal. The high frequency component of the R signal indicates an edge component of the input image signal.

FIGS. 8A to 8C are diagrams for explaining a detected phase of the high frequency component detector 1181. When a current pixel is indicated by a black circle and a pixel of the detected phase is indicated by a white circle as shown in FIG. 8A, the high frequency component detector 1181 calculates an absolute value of a difference (horizontal difference Act_H) between an adjacent pixel x_m at the left of a current pixel p to be processed, and an adjacent pixel x_p at the right of the current pixel p, in a screen horizontal direction, as schematically shown in FIG. 8B, and calculates an absolute value of a difference (vertical difference Act_V) between an adjacent pixel y_m above the current pixel p to be processed by one line, and an adjacent pixel y_p below the current pixel p by one line, in a screen vertical direction, as schematically shown in FIG. 8C. Accordingly, the horizontal difference Act_H and the vertical difference Act_V are respectively calculated according to Equations 4 and 5.

$$Act\_H = abs(x\_m - x\_p) \quad (4)$$

$$Act\_V = abs(y\_m - y\_p) \quad (5)$$

In Equations 4 and 5, abs denotes an absolute value.

Also, the high frequency component detector 1181 calculates a high frequency component Act_HV by adding the horizontal difference Act_H and the vertical difference Act_V as follows:

$$Act\_HV = Act\_H + Act\_V \quad (6)$$

Figure 9:
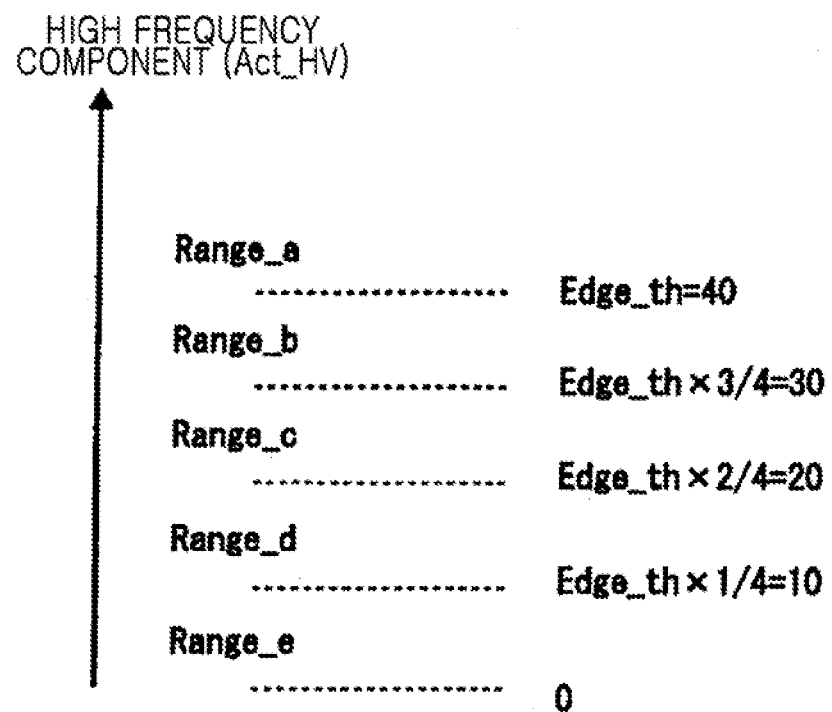
FIG. 9 is a diagram for explaining an example of a comparison operation of a high frequency component comparator of FIG. 7.

The high frequency component comparator 1182 obtains a comparison result indicating which one of threshold ranges (Range_a, Range_b, Range_c, Range_d, and Range_e) indicating 5 divided threshold value ranges of FIG. 9 includes the high frequency component Act_HV supplied from the high frequency component detector 1181 according to following equations:

$$Range\_a = Edge\_th < Act\_HV \quad (7a)$$

$$Range\_b = Edge\_th \times \tfrac{3}{4} < Act\_HV \leq Edge\_th \quad (7b)$$

$$Range\_c = Edge\_th \times \tfrac{2}{4} < Act\_HV \leq Edge\_th \times \tfrac{3}{4} \quad (7c)$$

$$Range\_d = Edge\_th \times \tfrac{1}{4} < Act\_HV \leq Edge\_th \times \tfrac{2}{4} \quad (7d)$$

$$Range\_e = Act\_HV \leq Edge\_th \times \tfrac{1}{4} \quad (7e)$$

Here, each of Range_a, Range_b, Range_c, Range_d, and Range_e is 1 when inequalities at the right of Equations 7a through 7e are satisfied, and is 0 when not satisfied. Also, Edge_th denotes a predetermined threshold value and is, for example, 40. Accordingly, for example, when the high frequency component Act_HV is 35, the high frequency component comparator 1182 satisfies only the inequality of Equation 7b, and thus outputs comparison results of Range_a=0, Range_b=1, Range_c=0, Range_d=0, and Range_e=0.

Figure 10:
FIG. 10 is a diagram for explaining an example of a comparison period of the high frequency component comparator of FIG. 7.

Continuously, the high frequency component comparator 1182 determines which one of the 5 threshold ranges (Range_a, Range_b, Range_c, Range_d, and Range_e) includes a total of 7 pixels including 3 pixels (indicated by white circles) each in front and at rear of a current pixel indicated by a black circle the comparison results of which has been obtained, as shown in FIG. 10, and sets 1 to a flag corresponding to a threshold range having the highest threshold value level, from among threshold ranges including the 7 pixels. Accordingly, if the high frequency component comparator 1182 determined, for example, comparison results of Range_a=1 and Range_e=1 in the above consecutive 7-pixel period, the high frequency component comparator 1182 sets 1 to a flag Flag_a corresponding to the threshold range Range_a having a higher threshold value level. Such an operation is represented by an equation below.

$$\begin{aligned}
&\text{for } (x = -3; x <= 3; x++)\{ \\
&\quad \text{if}(Range\_a(x) == 1) \; Flag\_a = 1; \\
&\quad \text{if}(Range\_b(x) == 1) \; Flag\_b = 1; \\
&\quad \text{if}(Range\_c(x) == 1) \; Flag\_c = 1; \\
&\quad \text{if}(Range\_d(x) == 1) \; Flag\_d = 1; \\
&\quad \text{if}(Range\_e(x) == 1) \; Flag\_e = 1; \\
&\}
\end{aligned} \quad (8)$$

The 7-pixel period, which is a comparing period of the high frequency component by the high frequency component comparator 1182 shown in FIG. 10, is a specific period indicating a small region in an object. Here, the specific period in the high frequency component comparator 1182 is not limited to the 7-pixel period shown in FIG. 10.

The gain calculating unit 1183 calculates a gain Depth_Gain according to a following equation based on the flag supplied from the high frequency component comparator 1182.

$$\begin{aligned}
&\text{if}(Flag\_a == 1) \quad Depth\_Gain = 2/8; \\
&\text{else if}(Flag\_b == 1) \; Depth\_Gain = 3/8; \\
&\text{else if}(Flag\_c == 1) \; Depth\_Gain = 5/8; \\
&\text{else if}(Flag\_d == 1) \; Depth\_Gain = 7/8; \\
&\text{else} \qquad\qquad\qquad Depth\_Gain = 8/8;
\end{aligned} \quad (9)$$

Accordingly, the gain calculating unit 1183 calculates the gain Depth_Gain having a small value when the flag having a value 1 from among the flags Flag_a through Flag_e supplied from the high frequency component comparator 1182 is a flag having a high threshold value level in the threshold range, and calculates the gain Depth_Gain having the maximum value 1 when the flag having a value 1 is the flag Flag_e indicating the threshold range Range_e having the minimum threshold value level. As shown in Equation 9, the gain Depth_Gain shows a ratio that is higher than 0 and lower than or equal to 1.

The multiplying unit 1184 multiplies the gain Depth_Gain calculated by the gain calculating unit 1183 and the R signal in the input image signal supplied from the image input unit 111 according to a following equation to output a multiplication result Rout.

$$R\_out = R \times Depth\_Gain \quad (10)$$

In Equation 10, R denotes a pixel value of a current pixel in the R signal.

The spatial LPF 1185 generates the R signal by applying a spatial LPF characteristic to the multiplication result R_out. Here, the spatial LPF 1185 is a well-known digital filter configured to have a horizontal LPF and a vertical LPF slave-connected to each other. For example, the horizontal LPF includes eight slave-connected delay devices respectively having one horizontal scanning period as a delay time, nine multipliers which multiply an input signal or an output signal of each delay device by each of the tap coefficients (1/32, 2/32, 4/32, 6/32, 6/32, 6/32, 4/32, 2/32, and 1/32), and nine taps including an adder that composes the multiplication results. Also, the vertical LPF includes two slave-connected delay devices respectively having one vertical scanning period as a delay time, three multipliers which multiply an input signal or an output signal of each delay device by each of the tap coefficients (1/4, 2/4, and 1/4), and three taps including an adder that composes the multiplication results.

In a region where a change of concavity and convexity components in the non-3D image is high, a shift pixel that has been texture-shifted by the stereo pair generating apparatus 20 at the rear stage overlaps with an adjacent pixel or does not include a to-be-displayed pixel, and thus, damage to a shift image is viewable. In this regard, the spatial LPF 1185 smoothens the concavity and convexity components by reducing the high frequency component of the multiplication signal supplied from the multiplying unit 1184, and reduces unnaturalness of a shift-processed image generated when the change of the continuous concavity and convexity components is high.

Next, operations of the object signal compensating unit 118 are described in more detail with reference to a timing chart of FIG. 11. As an example, as schematically shown in (A) of FIG. 11, it is assumed that, in an input R signal, pixel values in a small region of 5 pixels indicated by black circles transmitted during a period from a time t3 to a time t6 are 80, and pixel values of pixels indicated by white circles are 0. Accordingly, in this case, a gain of an R signal in a pseudo 3D image generating apparatus disclosed in Patent Document 1 is 80 during the period from the time t3 to the time t6, and is 0 in other periods, as shown in (B) of FIG. 11. Also, it is assumed that an R signal indicates a pixel value, for example, in a range from 0 to 255, according to a pattern.

Figure 11:
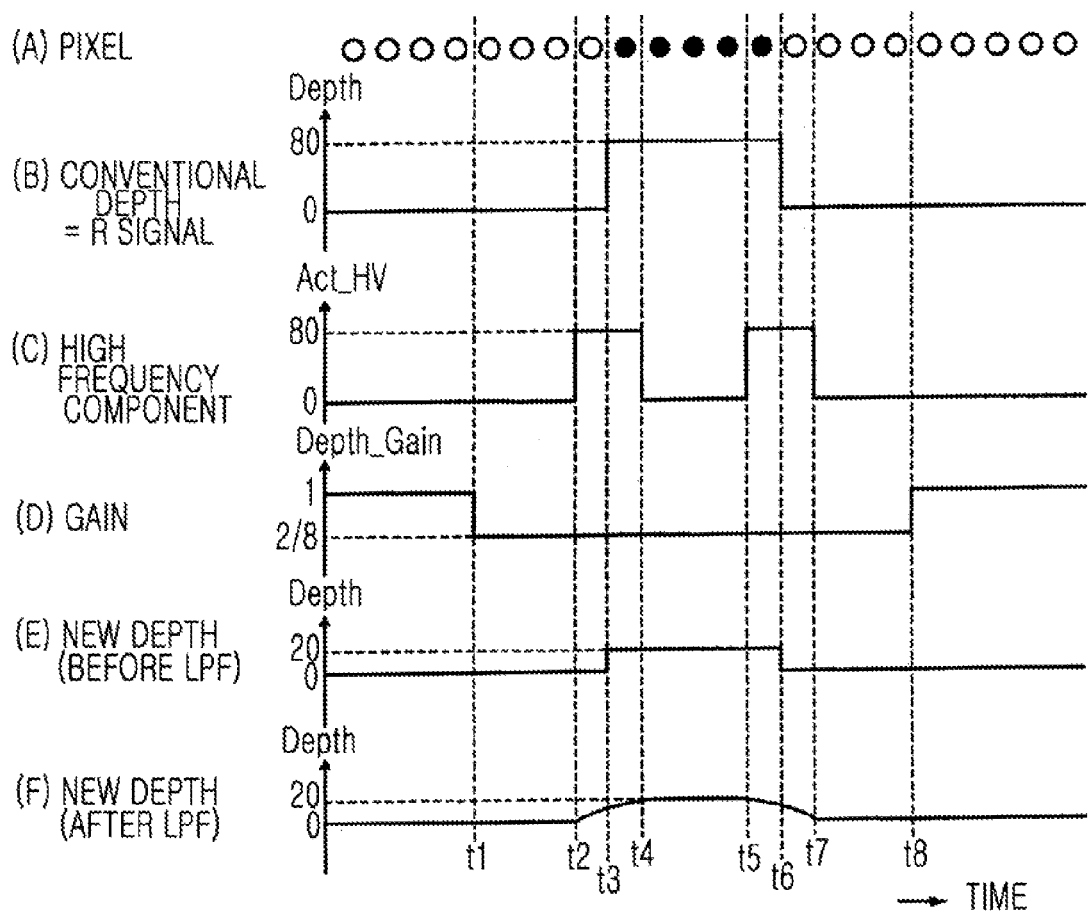
FIG. 11 is a timing chart for explaining an example of an operation of the object signal compensating unit of FIG. 7.

Regarding the input R signal, the high frequency component detector 1181, as shown in (C) of FIG. 11, outputs the high frequency component Act_HV having a value 80 during a period from a time t2, when a pixel having a value 0 and adjacent to the left of the first pixel having a value 80 input at the time t3 is input, to a time t4, when the second pixel having a value 80 and adjacent to the right of the first pixel is input. Also, the high frequency component detector 1181, as shown in (C) of FIG. 11, outputs the high frequency component having a value 80 during a period from a time t5, when the fifth pixel having a value 80 and adjacent to the left of an initial pixel having a value 0 and input after pixels each having a value 80 is input, to a time t7, when a pixel having a value of 0 and adjacent to the right of the initial pixel is input.

Accordingly, the high frequency component comparator 1182 outputs the flag Flag_a having a value 1 according to Equation 8 during a period from a time t1, when a pixel that is located 3 pixels before the pixel of the time t2 is input, to a time t8, when the fourth pixel that is located 3 pixels after the pixel of the time t7 is input. Also, the high frequency component comparator 1182 outputs the flag Flag_e having a value 1 according to Equation 8 during a period before the time t1 and after the time t8. Accordingly, the gain calculating unit 1183 calculates and outputs the gains Depth_Gain having a value ⅖ during the period from the time t1 to the time t8, and having a value 1 during the periods before the time t1 and after the time t8, as shown in (D) of FIG. 11, according to Equation 9.

Accordingly, as shown in (E) of FIG. 11, the multiplying unit 1184 calculates and outputs the multiplication results Rout having a value 20 (=80×⅖) only during the period from the time t3 to the time t6 when the R signal having a value 80 is input, and having a value 0 (=0×1 or 0×⅖) during the periods before the time t3 and after the time t6 when the R signal having a value 0 is input, according to Equation 10.

Accordingly, the spatial LPF 1185 applies a predetermined spatial LPF characteristic on the multiplication result R_out shown in (E) of FIG. 11 supplied from the multiplying unit 1184, and generates the R signal having a waveform which smoothly increases from a value 0 to a value 20 during the period from the time t2 to the time t4 and smoothly decreases from a value 20 to a value 0 during the period from the time t5 to the time t7, as a compensated object signal, as shown in (F) of FIG. 11. The R' signal is supplied to the adding unit 119 of FIG. 2. The adding unit 119 generates final depth estimation data by adding an image signal (i.e., an image signal of a background) that is the composed depth model supplied from the composed unit 117, and the R' signal (i.e., compensated object signal indicating concavity and convexity of an image) supplied from the object signal compensating unit 118.

As such, in order to generate depth estimation data, the depth estimation unit 11 of the present embodiment uses the R' signal shown in (F) of FIG. 11, wherein a concavity and convexity difference with an adjacent pixel in a small region of an image is suppressed compared to the R signal shown in (B) of FIG. 11, as the object signal to be added to the image signal that is the composed depth model by the adding unit 119, thereby, for example, suppressing a phenomenon where only a detailed portion (small area) in a same object excessively protrudes. As a result, according to the present embodiment, a generation of separation in a same object or discrepancy of a location relationship of objects may be prevented.

Referring back to FIG. 1, the texture shift unit 21 generates an image signal having a different viewpoint from the input image signal, based on the depth estimation data generated by the depth estimation unit 11 as described above, and the input image signal. For example, when the input image signal is a right-eye image signal, the texture shift unit 21 generates a left-eye image signal having a viewpoint moved to the left, based on a viewpoint of the right-eye image signal displayed on a screen. In this case, since a closer an image is, the more inward (towards a nose) the image looks to a user when a texture is displayed in a close-range view with respect to the user, the texture shift unit 21 generates an image signal where the texture is moved to the right of the screen by an amount according to the depth. Also, since a farther an image is, the more outward the image looks to the user when the texture is displayed in a distant view with respect to the user, the texture shift unit 21 generates an image signal where the texture is moved to the left of the screen by an amount according to the depth.

Here, depth estimation data of each pixel is indicated in a value Dd in 8 bits. The texture shift unit 21 generates an image signal where a texture of an input right-eye image signal corresponding to the value Dd is shifted to the right by a (Dd−m)/n pixel for each pixel, in an order from a small value Dd (i.e., from a texture disposed inside the screen). Here, m denotes a parameter (convergence value) showing extrusion, and n denotes a parameter (depth value) showing depth.

Also, for the user, a texture having a small value Dd indicating a depth estimation value is shown to be inside the screen, and a texture having a large value Dd indicating a depth estimation value is shown to be in front of the screen. The value Dd indicating depth estimation data, the convergence value m, and the depth value n are each in a range from 0 to 255, and for example, the convergence value m is 200 and the depth value n is 20.

Also, the present invention is not limited to above embodiments, and for example, the object signal compensating unit 118 may not include the spatial LPF 1185. Also, the object signal to be compensated for by the object signal compensating unit 118 is not limited to the R signal, and may be a blue (B) signal. Red and warm colors are advancing colors, whereas blue is a receding color of which a depth is recognized to be more inside than warm colors. Accordingly, if a blue portion is disposed inside, a 3D effect may be emphasized. Furthermore, a 3D effect may be emphasized by using both R and B signals as an object signal and disposing a red portion in front and a blue portion inside.

Also, the high frequency component comparator 1182 detects which one of the plurality of threshold value division ranges includes the high frequency component in the specific period, and sets 1 to the flag according to the additionally detected threshold value division range, but alternatively, the high frequency component comparator 1182 may detect a value of a supplied high frequency component without having to set a threshold value.

Also, regarding a stereo pair, a stereo pair may include an original image of a left-eye image and a different viewpoint image of a right-eye image by reversing right and left, Also, the pseudo 3D image generating apparatus 1 of FIG. 1 generates the left-eye image 24 by using the input non-3D image as the right-eye image 25, but alternatively, a right-eye image may be generated by using the input non-3D image as a left-eye image, and furthermore, a stereo pair may be formed by using a different viewpoint images of right- and left-eye images, i.e., by using a different viewpoint image in which a viewpoint is moved to the right and a different viewpoint image in which a viewpoint is moved to the left.

Also, an example of the stereo pair generating apparatus 20 which uses two viewpoints has been described, but when an image is displayed via a display apparatus capable of displaying two viewpoints or more, a plural viewpoints image generating apparatus which generates a number of different viewpoint images matching the number of viewpoints may be provided.

Also, a pseudo 3D display system may include an audio output unit. In this case, an environmental sound matching an image may be added with respect to image content that does not contain audio information, such as a still image.

Also, the present invention is not limited to providing the pseudo 3D image generating apparatus 1 of FIG. 1 or the depth estimation data generating apparatus 10 of FIGS. 2 and 7 by using hardware, and alternatively, a pseudo 3D image or depth estimation data may be generated by using software according to a computer program. In this case, the computer program may be read via a recording medium or via a network, to a computer.

According to the present invention, a pseudo 3D image that brings a natural 3D effect by preventing separation in a same object or discrepancy of a location relationship of objects can be generated.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A depth estimation data generating apparatus comprising:
   a generating unit which generates images of a plurality of basic depth models respectively indicating depth values of a plurality of basic scene structures;
   a composition ratio calculating unit which calculates a composition ratio between the images of the plurality of basic depth models by using statistics of at least some pixel values in a predetermined region in a screen of a non-3D image, so as to estimate a scene structure of the non-3D image whose depth information is neither included explicitly nor included implicitly like a stereo image;
   a composing unit which composes the images of the plurality of basic depth models generated by the generating unit according to the composition ratio and generates a basic depth model-composed image;
   a high frequency component detecting unit to which an object signal indicating object information about concavity and convexity of a pseudo 3D image is supplied from the non-3D image, and which detects a high frequency component indicating an absolute value of a difference between values of predetermined pixels in the object signal;
   a gain generating unit which generates a gain having a smaller value as a value of the high frequency component detected by the high frequency component detecting unit is higher;
   a compensated object signal generating unit which multiplies the object signal and the gain generated by the gain generating unit and generates a compensated object signal wherein a level of the object signal is compensated for; and
   an adding unit which adds the compensated object signal to the basic depth model-composed image composed by the composing unit and generates depth estimation data for generating an image having a viewpoint different from the non-3D image, the image constituting a pseudo 3D image with the non-3D image.

2. The depth estimation data generating apparatus comprising:
   a generating unit which generates images of a plurality of basic depth models respectively indicating depth values of a plurality of basic scene structures;
   a composition ratio calculating unit which calculates a composition ratio between the images of the plurality of basic depth models by using statistics of at least some pixel values in a predetermined region in a screen of a non-3D image, so as to estimate a scene structure of the non-3D image whose depth information is neither included explicitly nor included implicitly like a stereo image;
   a composing unit which composes the images of the plurality of basic depth models generated by the generating unit according to the composition ratio and generates a basic depth model-composed image;
   a high frequency component detecting unit to which an object signal indicating object information about concavity and convexity of a pseudo 3D image is supplied from the non-3D image, and which detects a high frequency component indicating an edge of the object signal;
   a gain generating unit which generates a gain having a smaller value as a value of the high frequency component detected by the high frequency component detecting unit is higher;
   a compensated object signal generating unit which multiplies the object signal and the gain generated by the gain generating unit and generates a compensated object signal wherein a level of the object signal is compensated for;

an adding unit which adds the compensated object signal to the basic depth model-composed image composed by the composing unit and generates depth estimation data for generating an image having a viewpoint different from the non-3D image, the image constituting a pseudo 3D image with the non-3D image;

a high frequency component comparing unit which compares and determines which threshold value division range from among a plurality of threshold value division ranges defined by threshold values includes the value of the high frequency component supplied from the high frequency component detecting unit for each specific period in which the object signal is pre-set, and outputs a flag indicating a threshold value division range having the highest threshold value including the value of the high frequency component in the each specific period; and a gain calculating unit which calculates a ratio corresponding to the threshold value division range indicated by the flag supplied from the high frequency component comparing unit as the gain, wherein ratios corresponding to the plurality of threshold value division ranges are pre-set, each ratio having a smaller value as a threshold value corresponding to each ratio is higher.

3. A depth estimation data generating method performed by a depth estimation data generating apparatus, the method comprising:

calculating a composition ratio between images of a plurality of basic depth models respectively indicating depth values of a plurality of basic scene structures, by using statistics of at least some pixel values in a predetermined region in a screen of a non-3D image, so as to estimate a scene structure of the non-3D image to which depth information is neither included explicitly nor included implicitly like a stereo image;

generating a basic depth model-composed image by composing the images of the plurality of basic depth models according to the composition ratio;

detecting a high frequency component indicating an absolute value of a difference between values of predetermined pixels in an object signal, the object signal indicating object information about concavity and convexity of a pseudo 3D image, and the object signal being supplied from the non-3D image;

generating a gain having a smaller value as a value of the high frequency component detected via the detecting of the high frequency component is higher;

generating a compensated object signal wherein a level of the object signal is compensated for, by multiplying the object signal and the gain generated via the generating of the gain; and adding the compensated object signal to the basic depth model-composed image composed via the generating of the basic depth model-composed image to generate depth estimation data for generating an image having a different viewpoint from the non-3D image, the image constituting a pseudo 3D image with the non-3D image.

4. A non-transitory computer readable storage medium having recorded thereon a depth estimation data generating program which is realized by a computer, the program comprising:

calculating a composition ratio between images of a plurality of basic depth models respectively indicating depth values of a plurality of basic scene structures, by using statistics of at least some pixel values in a predetermined region in a screen of a non-3D image, so as to estimate a scene structure of the non-3D image to which depth information is neither included explicitly nor included implicitly like a stereo image;

generating a basic depth model-composed image by composing the images of the plurality of basic depth models according to the composition ratio;

detecting a high frequency component indicating an absolute value of a difference between values of predetermined pixels in an object signal, the object signal indicating object information about concavity and convexity of a pseudo 3D image, and the object signal being supplied from the non-3D image;

generating a gain having a smaller value as a value of the high frequency component detected via the detecting of the high frequency component is higher;

generating a compensated object signal wherein a level of the object signal is compensated for, by multiplying the object signal and the gain generated via the generating of the gain; and adding the compensated object signal to the basic depth model-composed image composed via the generating of the basic depth model-composed image to generate depth estimation data for generating an image having a different viewpoint from the non-3D image, the image constituting a pseudo 3D image with the non-3D image.

5. A pseudo 3D image generating apparatus comprising:

a different viewpoint image generating unit which generates a different viewpoint image by shifting a texture of a non-3D image by an amount according to depth estimation data of a portion corresponding to the texture of the non-3D image, based on the depth estimation data generated by the apparatus of claim 1 to which the non-3D image is supplied and the non-3D image to which depth information is neither included explicitly nor included implicitly like a stereo image; and an output unit which outputs a pseudo 3D image wherein one of the non-3D image and the different viewpoint image is a left-eye image and the other is a right-eye image.

6. A pseudo 3D image generating method comprising:

generating a different viewpoint image by shifting a texture of a non-3D image by an amount according to depth estimation data of a portion corresponding to the texture of the non-3D image, based on the depth estimation data generated by the method of claim 3 to which the non-3D image is supplied and the non-3D image to which depth information is neither included explicitly nor included implicitly like a stereo image; and outputting a pseudo 3D image wherein one of the non-3D image and the different viewpoint image is a left-eye image and the other is a right-eye image.

7. A non-transitory computer readable storage medium having recorded thereon a pseudo 3D image generating program which is realized by a computer, the program comprising:

generating a different viewpoint image by shifting a texture of a non-3D image by an amount according to depth estimation data of a portion corresponding to the texture of the non-3D image, based on the depth estimation data generated by the program of claim 4 to which the non-3D image is supplied and the non-3D image to which depth information is neither included explicitly nor included implicitly like a stereo image; and outputting a pseudo 3D image wherein one of the non-3D image and the different viewpoint image is a left-eye image and the other is a right-eye image.

* * * * *